March 20, 1962 H. H. MOODY 3,025,647
TWO-WAY POSITIVE CABLE DRIVE MECHANISM
Filed Jan. 12, 1960
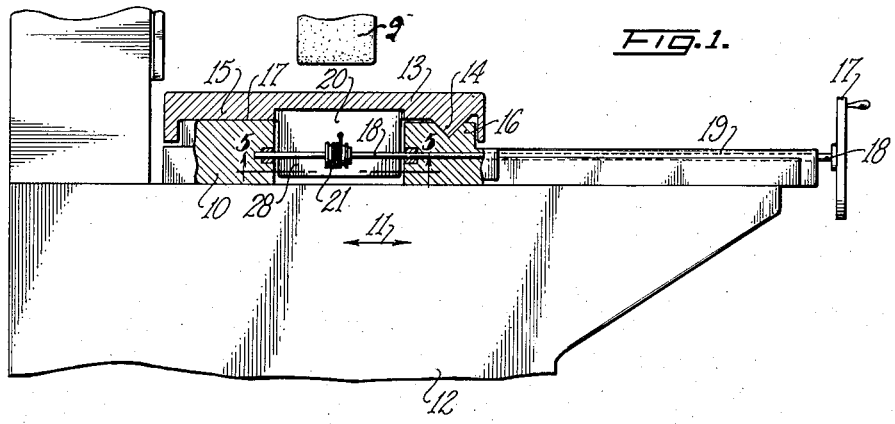
INVENTOR.
HARVEY H. MOODY
BY
—ATTORNEY—

3,025,647
TWO-WAY POSITIVE CABLE DRIVE MECHANISM
Harvey H. Moody, La Habra, Calif.
(5135 Coffman-Pico Road, Pico Rivera, Calif.)
Filed Jan. 12, 1960, Ser. No. 1,973
7 Claims. (Cl. 51—240)

This invention relates to drive mechanisms of the cable type, for adjusting movable parts of various apparatus to selected positions of adjustment. The invention is applicable to the positioning of machine tool tables and beds, and is likewise applicable to the positioning of parts of other apparatus, such as control surfaces and other operative parts of aircraft (commonly actuated through cable type movement transmitting devices) and other comparable mechanisms.

The invention is embodied in a movement transmitting apparatus including a driving drum and a cable which is wrapped around the drum and attached thereto so that rotation of the drum will transmit linear travel to the cable, which linear travel is transmitted by the cable to the part that is to be adjustably positioned. An important object of the invention is to provide such a cable drive mechanism having an improved arrangement and means for anchoring the cable to the driving drum. An important object of the invention is to provide a driving connection between the drum and the cable such as to minimize wear between the drum and cable. A further object is to provide a cable drive mechanism having maximum smoothness of take-up winding of the cable upon the drum.

Other objects and advantages will become apparent in the ensuing specification and appended drawing in which:

FIG. 1 is a side view, partially in section, of a surface grinder having a table drive mechanism embodying my invention;

FIG. 2 is a detail transverse sectional view of the cable-drive drum and a portion of the cable and its driving connection with the drum;

FIG. 3 is a fragmentary sectional view taken on the line 3—3 of FIG. 2;

FIG. 4 is a fragmentary sectional view taken on the line 4—4 of FIG. 2;

FIG. 5 is a sectional view in a horizontal plane, looking upwardly as indicated by line 5—5 of FIG. 1; and FIG. 6 is a plan view of a cable drive embodying a modified form of the invention.

Referring now to the drawings in detail, I have shown therein, as an example of one form in which the invention may be embodied, a cable drive mechanism for a hand surface grinder of a type embodying a saddle 10 mounted for cross feed in the directions indicated by double arrow 11 of FIG. 1, upon a suitable base 12 of any suitable type (e.g. floor pedestal type or bench type); together with a work-supporting table 13 having longitudinal slides (e.g. V-slides 14 and flat slides 15) slidably supported by suitable ways (e.g. V-way 16 and flat slideway 17) at the top of the saddle 10. Suitable cross feed adjustment mechanism will normally be incorporated in such a grinder, for cross-feeding the saddle 10, but is not disclosed herein since this invention does not relate to the cross feed mechanism.

The longitudinal table-travel feed mechanism of this invention is actuated by a conventional hand wheel 17 and an actuator shaft 18 which is journalled in the forward portion 19 of the saddle 10, bridges across a space 20 defined between the ways 16 and 17, and is journalled in the rear section of the saddle 10, of which the way 17 constitutes the upper portion. As will be seen in FIG. 5, the space 20 extends the full length of the saddle 10.

The shaft 18 extends through and mounts a drive transmitting drum 21 which is secured to the shaft by suitable means such as a key 22 (FIG. 5) engaged in suitable keyways 23 in the shaft and in the drum 21.

A drive cable 24 is wrapped around the drum 21 with three full turns including outer turns 25 and an intermediate turn 26. The ends of the cable are anchored by suitable tension-adjusting and take-up connections 27 to end members 28 which project downwardly from the respective ends of table 13 to the level of shaft 18, or below in a normal, centered position of the table 13 midway between its two limits of longitudinal travel at the respective ends thereof.

The cable 24 is anchored to the drum 21 by a coupling element comprising a spherical ball 29 which is clamped around the intermediate turns 26 of the cable so as to be permanently fixed thereto. The ball 29 is at the midpoint of central turn 25, as shown in FIG. 5.

The coupling ball 29 functions as a male clutch or coupling element, being received in a cylindrical coupling socket 30 disposed radially in the periphery of drum 21. The ball 29 and socket 30 provide a drive connection between the cable and the drum throughout substantially three complete revolutions of the drum between the intermediate position shown in FIG. 5 and two limit positions in each of which the ball is substantially at the point of tangency between an outer turn 25 of the cable and an adjoining straight stretch 24′ of the cable. Overtravel rotation of the drum 21 beyond either of these limit positions is possible, and would cause the ball 29 to become disengaged from the socket 30 (thus avoiding damage caused by rotating hand wheel 17 beyond the limit positions), but upon rotating the drum in the opposite direction, the ball will reenter the socket and establish the driving connection between the drum and the cable at exactly the proper relative position of cable and drum to effect accurate movement of the table to various positions determined by the positions of rotation of hand wheel 17.

The turns 25 and 26 are wound around the drum substantially in side by side contact with one another so as to maintain maximum tautness in the cable (the tension in the cable tends to close the helix constituted by the three turns 25 and 26). If the three turns of the cable are to be maintained uniformly outwardly of the cylindrical periphery of drum 21, however, the lateral turns 25 must necessarily be spread apart at the point where the ball 29 is interposed between them, since the diameter of the ball is substantially greater than the diameter of the cable. Consequently, I have found that under these conditions there is a tendency for the lateral turns of the cable to climb upwardly on the respective sides of the ball 29 in those sectors of revolution of the drum wherein the ball 29 reestablishes contact with an end portion of the cable upon returning toward its medial position of FIG. 5 where it is temporarily out of contact with a lateral turn. The invention solves this problem in a satisfactory manner by providing, in the cylindrical periphery of the drum 21, a groove 31 which is centered on the radial axis of socket 30 and extends approximately 90° on either side thereof in a circumferential direction in a plane normal to the axis of shaft 18. The groove 31 varies progressively in depth from maximum depth at the socket 30 to zero depth at points preferably equidistant from socket 30 on either side thereof. In the example shown, the groove 30 extends approximately 90° on each side of socket 30. Thus the groove 31 comprises in effect two half-grooves each of which is of ramp form, being inclined along a spiral path from points of tangency with the cylindrical surface of drum 21 at approximately diametrically opposite points indicated at 32, down to maximum depth at respective sides of socket 30. At these points the groove 31 has a depth greater than the diameter of cable 24, such that all but a small percentage of the diameter of ball 29 along the radial axis of socket 30, is disposed below the cylindrical surface of drum 21. The portion of ball 29 which projects above the surface of the drum is sufficiently narrow in area so that the lateral turns 25 of the cable (FIG. 3) simultaneously contacting the respective sides of ball 29 and the cylindrical surface of the drum 21, will be spread apart by the ball a distance not substantially greater than the diameter of the cable. Thus the lateral turns 25 can maintain substantial contact with the intermediate turn 26, without climbing upwardly on the sides of the ball 29.

It will now be apparent that a short portion of the cable on either side of ball 29 (having a length equal to approximately one-half the circumference of the cylindrical surface of drum 21) will extend beneath said cylindrical surface and will be received and positioned between the sides of groove 31 so as to maintain the intermediate turn 26 of the cable properly positioned between the ends of the drum 21 at all times. The coupling ball 29 functions to couple the cable to the drum in a manner such as to transmit rotational drive from the drum to the cable.

The coupling element 29 need not necessarily be spherical (although the spherical form is preferred). As an equivalent alternative, as shown in FIG. 6, the coupling element 29a may be of elongated capsule form (a cylindrical tube or sleeve with rounded ends) and may be engaged in a correspondingly circumferentially elongated socket 30a in the drum 21a. In this case, it will be understood that the coupling element 29a instead of being of straight cylindrical form, will have a longitudinal curvature corresponding to the curvature of the periphery of drum 21a.

The driving elements 29, 29a may be attached to the cable by shrinking them through a swaging or compression operation so as to effect a mechanical clamping of the driving element to the cable.

By properly adjusting connectors 27, tension is maintained in the cable 24, sufficient to maintain the three turns 25 and 26 tightly wrapped around the drum at all times. The radially inward component of said tension, applied to coupling ball 29, will maintain the latter seated in the socket 30 so as to maintain a positive drive between the cable and the drum at all times, within the limits of operational movement of the apparatus.

The groove 31 not only provides for the desirable close spacing of turns 25 and 26 while avoiding climbing of the cable on the ball 29, as pointed out above, but has the additional advantage of locating the ball 29 at a depth in the socket 30 such that the walls of the socket on the respective sides of groove 31 will extend outwardly almost the full diameter of coupling ball 29 so as to provide ample surface for driving engagement with the ball 29 both outwardly and inwardly of the center of the ball. That is to say, the ball is almost completely enclosed within the socket 30, its center is disposed well below the outward limits of the drive-bearing surfaces of socket 30 on respective sides of groove 31, and there is no possibility of the ball 29 slipping out of the socket or becoming uncoupled from the drum 21 under the forces transmitted between the drum and the ball, within the range of operation of the apparatus.

I claim:

1. In a cable drive for positioning a movable part of a mechanism in accordance with the position of rotation of a rotary actuator device: a drum for transmitting actuator movement of said actuator device; means mounting said drum for rotation on an axis transverse to the direction of transmission of said actuator movement; said drum having a cylindrical cable-bearing periphery coaxial with said axis and having in said periphery a coupling socket and a groove sunk below said periphery and extending circumferentially on respective sides of said socket, said groove having maximum depth at said socket and decreasing gradually in depth from said socket to circumferential limits of said groove merging with the surface of said drum; a cable having ends adapted to be attached to respective extremities of said movable part for adjustably positioning the same, and having, between said ends, a plurality of turns wrapped upon said periphery and around said drum, one of said turns having a part thereof received in said groove; and a coupling element fixed to said cable and fitted into said socket, the deeper portion of said groove providing for location of said coupling element with a major portion of its diameter disposed below the cylindrical surface of said drum, to the extent that adjacent turns of said cable may ride upon the cylindrical surface of said drum on respective sides of said coupling element without climbing on the sides of the latter.

2. In a cable drive for positioning a movable part of a mechanism in accordance with the position of rotation of a rotary actuator device: a shaft for transmitting actuator movement of said actuator device; means mounting said shaft for rotation on an axis transverse to the direction of transmission of said actuator movement; a drum fixed upon said shaft and having a cylindrical cable-bearing periphery coaxial with said axis and having in said periphery a radial coupling socket and a groove sunk below said periphery and extending circumferentially on respective sides of said socket, said groove having maximum depth at said socket and decreasing gradually in depth from said socket to limits approximately 90° away from said socket, said groove merging with the surface of said drum at said limits; a cable having ends adapted to be attached to respective extremities of said movable part for adjustably positioning the same, and having, between said ends, a plurality of turns wrapped upon said periphery and around said drum, one of said turns having a part thereof received in said groove; and an annular coupling element encircling and fixed to said cable and fitted into said socket, the deeper portion of said groove providing for location of said coupling element with a major portion of its diameter disposed below the cylindrical surface of said drum, to the extent that adjacent turns of said cable may ride upon the cylindrical surface of said drum on respective sides of said coupling element without climbing on the sides of the latter, and without being spread apart substantially more than the diameter of the intervening turn of said cable passing through said coupling element.

3. An apparatus as defined in claim 2, wherein said coupling element is in the form of a ball having a diametral bore through which said cable extends, said ball being clamped upon said cable.

4. An apparatus as defined in claim 2, wherein said coupling element is in the form of an elongated tubular capsule having a diametral bore through which said cable extends, said capsule being clamped upon said cable.

5. In combination with a pair of laterally spaced ways defining between them a longitudinally extending space, and a variable position part having slides mounted on said ways for movement parallel to the longitudinal axis of said space and having extremities projecting across the ends of said space; an actuator mechanism including a shaft journalled in said ways and traversing said space for rotation on a transverse axis at right angles to said longitudinal axis; rotary actuator means for driving the outer end of said shaft; a drum secured upon said shaft within said space, said drum having a cylindrical cable-bearing periphery coaxial with said transverse axis and having in said periphery a coupling socket and a groove sunk below said periphery and extending circumferentially on respective sides of said socket, said groove having maximum depth at said socket and decreasing gradually in depth from said socket to circumferential limits of said groove merging with the surface of said drum; a cable having ends attached to said extremities of said variable position part and having, between said ends, a plurality of turns wrapped upon said periphery and around said drum, one of said turns having a part thereof received in said groove; and an annular coupling element encircling and anchored to said cable and fitted into said socket, the deeper portion of said groove providing for location of said coupling element with a major portion of its diameter disposed below the cylindrical surface of said drum, to the extent that adjacent turns of said cable may ride upon the cylindrical surface of said drum on respective sides of said coupling element without climbing on the sides of the latter.

6. In a machine tool having a pair of laterally spaced ways defining between them a longitudinally extending space, and a variable position table having slides mounted on said ways for movement parallel to the axis longitudinal of said space and having extremities projecting downwardly across the ends of said space; an actuator mechanism including a shaft journalled in said ways and traversing said space for rotation on a transverse axis at right angles to said longitudinal axis; a handwheel secured to the outer end of said shaft, for driving said shaft; a drum secured upon said shaft within said space, said drum having a cylindrical cable-bearing periphery coaxial with said transverse axis and having in said periphery a cylindrical coupling socket extending radially of said drum and a groove sunk below said periphery and extending circumferentially on respective sides of said socket, said groove having maximum depth at said socket and decreasing gradually in depth from said socket to circumferential limits of said groove merging with the surface of said drum; a cable having ends attached to said extremities of said variable position part and having, between said ends, a plurality of turns wrapped upon said periphery and around said drum, one of said turns having a part thereof received in said groove; and an annular coupling element encircling and anchored to said cable and fitted into said socket, the deeper portion of said groove providing for location of said coupling element with a major portion of its diameter disposed below the cylindrical surface of said drum, to the extent that adjacent turns of said cable may ride upon the cylindrical surface of said drum on respective sides of said coupling element without climbing on the sides of the latter.

7. In a mechanism including a movable part, in combination therewith: a cable drive for positioning said movable part in accordance with the position of rotation of a rotary actuator device, said cable drive comprising: a drum for transmitting actuator movement of said actuator device; means mounting said drum for rotation on an axis transverse to the direction of transmission of said actuator movement; said drum having a cylindrical cable-bearing periphery coaxial with said axis and having in said periphery a radially extending cylindrical coupling socket and a groove of generally semi-cylindrical cross section sunk below said periphery and extending circumferentially on respective sides of said socket, said groove having maximum depth at said socket and being of spiral contour circumferentially, decreasing gradually in depth from said socket to circumferential ends of said groove at approximately 90° from said socket, said ends merging with the surface of said drum; a cable having ends attached to respective extremities of said movable part for adjustably positioning the same and having, between said ends, a plurality of turns wrapped upon said periphery and around said drum, one of said turns having a part thereof received in said groove; and an annular coupling ball encircling and anchored to said cable and fitted into said socket, the deeper portion of said groove providing for location of said ball with a major portion of its diameter disposed below the cylindrical surface of said drum, to the extent that adjacent turns of said cable may ride upon the cylindrical surface of said drum on respective sides of said coupling element without climbing on the sides of the latter, and without being spread apart substantially more than the diameter of the intervening turn of said cable passing through said coupling element.

References Cited in the file of this patent
UNITED STATES PATENTS

| | | |
|---|---|---|
| 927,695 | Stake | July 13, 1909 |
| 2,672,057 | Bratz | Mar. 16, 1954 |
| 2,901,764 | Anderson | Sept. 1, 1959 |